Jan. 31, 1967   K. F. RUBERT ETAL   3,301,046
METHOD OF OBTAINING PERMANENT RECORD OF SURFACE FLOW PHENOMENA
Filed Oct. 14, 1964   2 Sheets-Sheet 1

INVENTORS
KENNEDY F. RUBERT
ALLEN R. VICK
EARL H. ANDREWS, JR.
CHARLES B. KING

BY
Wallace J Nelson
ATTORNEYS

United States Patent Office 3,301,046
Patented Jan. 31, 1967

3,301,046
METHOD OF OBTAINING PERMANENT RECORD OF SURFACE FLOW PHENOMENA
Kennedy F. Rubert, Yorktown, Allen R. Vick and Earl H. Andrews, Jr., Newport News, and Charles B. King, Hampton, Va., assignors to the United States of America as represented by the Administrator of the National Aeronautics and Space Administration
Filed Oct. 14, 1964, Ser. No. 403,960
14 Claims. (Cl. 73—147)

The invention described herein may be manufactured and used by or for the Government of the United States of America for governmental purposes without the payment of any royalties thereon or therefor.

This invention relates generally to a method of obtaining a permanent record of surface flow phenomena for future study and relates with particularity to a method of producing a mold of the surface flow pattern observed on a wind tunnel test model, when employing the oil-smear indicating technique, and displaying this mold in such manner as to permit photographic permanent recordation of the surface flow pattern obtained.

In experimental aerodynamic research there is constant need for information on the state and nature of the flow over the surfaces being designed. For example, in the design of aerodynamic configurations, it is generally desirable to identify the regions of laminar and of turbulent flow, the regions of reversed or separated flow, and the region of significant lateral flow. Where such regions can be readily identified, other important basic information may sometimes then be immediately determined, such as the locations and approximate strengths of shocks, locations of pressure peaks and separation bubbles, and the locations of appreciable lateral pressure gradients.

Similarly, in the design of exit nozzles for jet engines and rocket motors, the internal flow of gases impinging upon and exiting through the nozzles must be considered for optimum design thereof to minimize areas of surface erosion, and the like. Thus, surface flow information obtained in wind tunnel tests is an invaluable aid in the design of both the external and internal surface areas of present and contemplated aerodynamic vehicular configurations.

The normal way of obtaining a permanent record of the surface flow phenomena observed in a specific wind tunnel test is to photograph the model during and after test completion. Under presently known procedures, colored inks, petroleum-base oils, and other suitable indicators, are applied to strategic parts of the model before or during testing with fluid flow thereof during wind tunnel testing serving as visual indications of the surface flow about the particular model under specific test conditions. This ink or oilflow also may be adapted to fluoresce under ultraviolet light as a further photographic aid in acquiring a permanent record of the surface flow phenomena for a specific test situation.

While this known process has proved quite adequate for obtaining permanent records of most external surface flow phenomena, the small diameters and inaccessible locations of tubular nozzles and the like, prevent adequate visual observation of internal surface flow thereon during wind tunnel testing. Also, since the small diameter nozzles and other complicated and inaccessible internal cavities or passageways will not admit presently used photographic equipment, serious difficulty has been experienced in obtaining photographs and records of the internal surface flow occurring in experimental models of this type. Thus, present attempts to record this needed information have resulted in the loss of a considerable amount of detail and numerous distortions when attempting to make a composite photograph of the surface flow phenomena.

In addition, inaccessible locations due to the complex external and internal shapes of presently designed vehicles prohibit or limit the use of photographs for permanent recordation. There is thus a definite need in the art for a process by which a permanent record of the surface flow phenomena obtained in a specific test on complicated shaped wind tunnel test models can be lifted from the model surfaces and exhibited in such manner as to be suitable for photographing, or otherwise recording, for future reference to prove theoretical calculations and in determining the necessity for further machining or alteration of the aerodynamic model design.

Accordingly, it is an object of the present invention to provide a reliable process for obtaining a permanent record of the surface flow phenomena observed in a specific test of a wind tunnel test model.

Another object of the present invention is the provision of a process of lifting the oil smears from the surface of a wind tunnel test model when employing the oil-smear-flow-indicator technique in such manner as to obtain a permanent pattern of the surface flow phenomena obtained in a specific test.

Still another object of the present invention is the method of simultaneously cleaning the surface of a wind tunnel test model and permanently recording an accurate pattern of the oil streak pattern developed on the model during a wind tunnel test.

An additional object of the present invention is a process of lifting the oil smears from the surface of an aerodynamic test model after being tested in a wind tunnel by use of the oil-smear technique, and without smudging thereof, so as to retain every minute detail of the oil smear pattern.

Another object of the present invention is the method of obtaining a color contrast mold of the surface flow phenomena observed on a complicated shaped model in a specific wind tunnel test.

Yet another object of the present invention is a method of lifting a pattern of the surface flow phenomena obtained on a test model from locations normally inaccessible for photographing and, displaying the pattern in a manner suitable for photographing and permanent recordation.

In accordance with the present invention, the foregoing and other objects are obtained by employing a mixture of oil and lampblack to selected areas of a specific wind tunnel test model, subjecting the test model to a specific wind tunnel test; and, after completion of the test, shutting down the wind tunnel, removing the model, and applying a film of a liquid room-temperature vulcanizable elastomeric material over the entire model test surface area and permitting this film to cure. As the elastomeric material cures, it completely absorbs the oil smear on the test model and retains every minute detail of the surface flow pattern as indicated by these oil smears.

After curing, the film of flexible elastomeric material is stripped from the test model to provide a pattern of the surface flow which may then be displayed for suitable photographing and permanent recordation thereof.

A more complete appreciation of the invention and many of the attendant advantages thereof will be readily appreciated as the same becomes better understood by references to the following detailed description and examples when considered in connection with the accompanying drawings, wherein.

Figure 1:
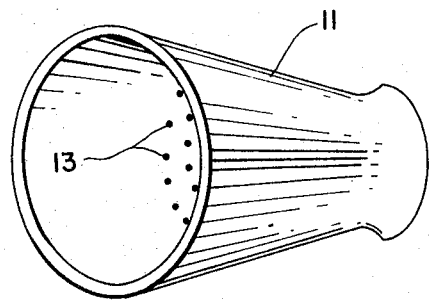
FIG. 1 is a view of a simple aerodynamic model, a rocket nozzle, with oil-lampblack spots strategically positioned internally thereof.

Referring now to the drawings, and more particularly to FIG. 1, a simplified model of a rocket nozzle is shown to illustrate the principles of the present invention, and is designated by reference numeral 11. As shown in the figure, a plurality of individual drops of a suitable oil, having a quantity of lampblack dispersed therein, and designated by reference numeral 13, are positioned at strategic locations about the internal surface of model 11 prior to subjecting the model to a wind tunnel test.

After testing in a conventional manner, model 11 is removed from the tunnel and the individual drops of oil-lampblack, having spread under the influence of tunnel airflow, will appear as individual lines extending in the direction of the airflow back from the point where each initial drop of oil-lampblack 13 was originally positioned. The specific dimension of the flow pattern will be dependent upon the physical property characteristics of the oil employed for a particular test, the length of time, pressure and temperature of the airstream employed in a particular test, as well as other conventional factors, as is well known in the oil-smear wind tunnel testing technique.

Figure 2:
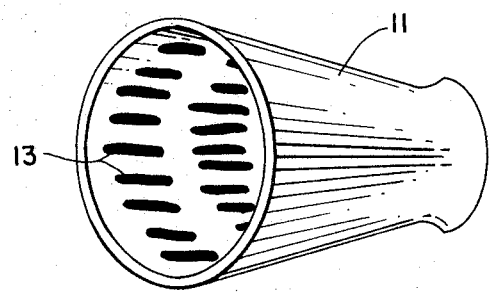
FIG. 2 is another view of the model after being subjected to a wind tunnel test, showing the oilflow pattern therein.

A simplified flow pattern is illustrated in FIG. 2 with the individual droplets of oil 13 being shown as streaks, as they would appear in a very simplified and low-pressure test. This illustration is merely to demonstrate the principle of the present inventive process and is in no way to be construed as limiting on the present invention.

After a particular wind tunnel test has been completed, the wind tunnel is shut down and model 11 removed therefrom with the surface flow phenomena being indicated by the pattern of the oilflow appearing thereon. In order to record the particular pattern for a specific test, it is necessary to photograph or otherwise obtain a permanent record of this surface flow prior to altering or changing the model surface or prior to conducting a different test at different temperatures and times. Although it would appear relatively simple to photograph the illustrated flow pattern, as shown in FIG. 2, it is apparent that for small diameter nozzles and other complicated aerodynamic designs, such for example as some of those presently used and contemplated for high speed aerodynamic vehicles, numerous areas on the models are difficult or inaccessible to being photographed. It was to solve this problem that resulted in the present invention being made.

In the present invention, model 11 may then be coated over the entire test surface area with a thin film of a catalyzed room-temperature vulcanizable silicone rubber. Any one of several conventional coating techniques may be employed to apply the rubber coating. For example, where the oilflow pattern is visible, as in the small diameter nozzle 11 illustrated in FIGS. 1 and 2, a small quantity of the liquid rubber may be slowly poured in between oil streaks 13 with nozzle 11 then being slowly rotated to permit flow thereof over adjacent oil streaks without appreciably distorting the oilflow pattern. This process is repeated between other of the oil streaks until the entire test surface area is coated with the silicone rubber. For areas not readily visible, a slow dip or very light pressure spray coat serves to adequately coat the test surface area without undue disruption of the oilflow surface pattern obtained.

Upon curing, a unitary film of elastomeric silicone rubber having the oilflow pattern absorbed therein may be stripped from the model, and thereby expose a molded surface of the surface flow phenomena obtained for this specific wind tunnel test. Absorption of the oil from the model is complete to such an extent that the model surface is clear of all traces of the oil smears after removal of the rubber mold. After the rubber mold becomes vulcanized, or cured, the mold with its pattern of oil is substantially smudge-proof since the oil becomes embedded within the rubber material as it is cured.

Figure 3:
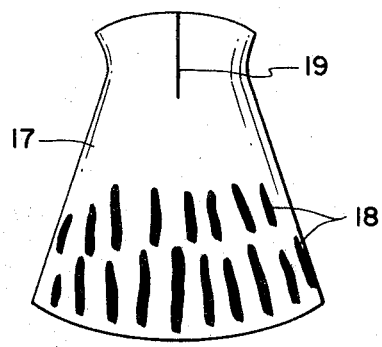
FIG. 3 is a view of the molded elastomeric coating employed to lift the surface flow pattern from the model as it would be displayed to be photographed.

Referring now to FIG. 3, a molded pattern 17 of the surface flow phenomena obtained in a simplified test of nozzle 11 is shown as it would be displayed for photographing. As shown therein, sharp contrast is obtained between the white elastomeric mold material and the dark oilflow streaks 18 absorbed therein. Any number of suitable incisions or slits may be made in mold 17, one of which is shown in FIG. 3, and designated by reference numeral 19, to assist in stripping the cured mold from model 11.

*The process*

Figure 4:
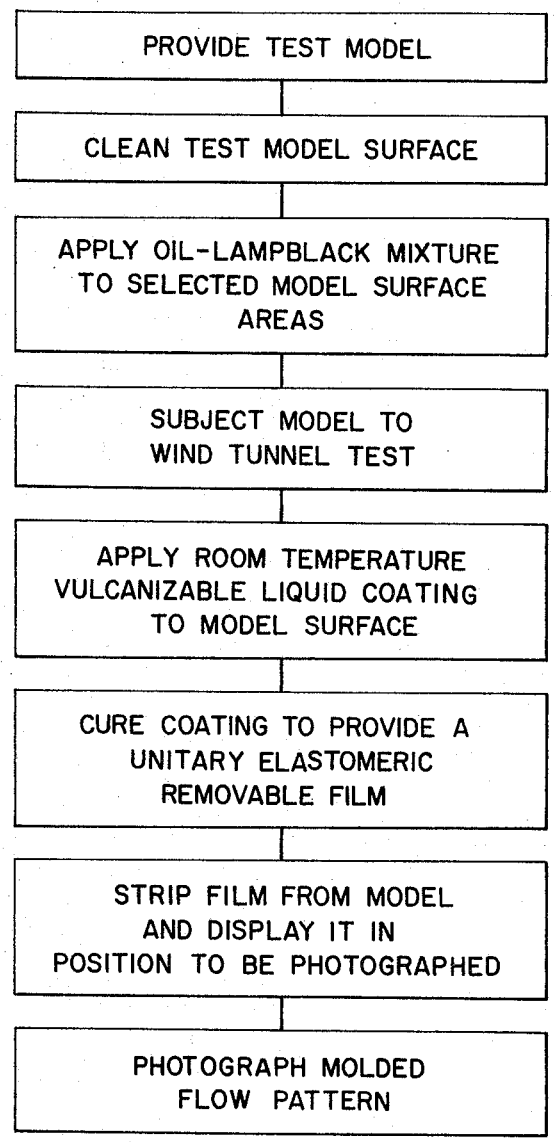
FIG. 4 is a flow diagram of the steps in obtaining permanent recordation of surface flow phenomena according to the present invention.

The specific steps in the present inventive process are exemplified in the flow diagram as shown in FIG. 4. That is, the model is prepared for testing by providing a clean, readily wettable and nonadsorbent surface area. For metallic model surfaces, this is readily accomplished by dipping the model in a suitable degreasing solvent such for example, methyl ethyl ketone (MEK), acetone, or the like, and then drying the model in a conventional manner. This cleaning process is given as exemplary only and other conventional degreasing solutions and processes for cleaning metal surfaces will suffice.

In the use of wood or other adsorbent type model configurations, a coating layer of a suitable cured plastics, or the like, may be applied to the model surface to provide the necessary clean and nonadsorbent surface area thereon. A mixture of a suitable oil, such for example kerosene, and a small quantity of commercial lampblack is then applied to the strategic locations of the clean model. In the simplified illustration shown in the drawings the oil-lampblack solution is applied in dots to circumferential areas of the internal surface of nozzle 11 by, for example, the use of a small stiff-bristled brush. In some instances, it may be desirable to smear the entire model surface area with the indicator solution. The model is then subjected to the desired wind tunnel test, as is well known in the art and, after completion of the test, the tunnel is shut down and the model removed therefrom and coated with the room-temperature vulcanizable elastomer, as described hereinbefore.

As is well known in the oil-smear technique, even high viscosity oil films tend to become very thin and some of the constituents therein, being volatile, are removed by the tunnel flow, leaving only the most viscous ingredients thereof on the test model, when sustained high velocity wind tunnel tests are conducted. The surface flow pattern in this situation thus becomes essentially fixed by the remaining viscous oil and no appreciable change occurs therein while the tunnel is being shut down and the model removed therefrom. For this reason, delays of several hours before making a mold of the surface flow pattern after test completion, are permitted without adversely affecting the molded pattern obtained.

For low airspeed and low-temperature wind tunnel tests, commercial grade kerosene with a suitable quantity of lampblack dispersed therein, for example, approximately one part, by weight, of lampblack to approximately ten parts, by weight, of kerosene adequately indicates and retains the flow pattern for a sufficient period of time after testing to permit the making of a permanent mold of the flow pattern by the present invention. This oil-lampblack ratio is given as illustrative only and may be altered as test conditions vary within the scope of this invention. A more detailed description of various oils and the viscosities thereof as employed in the oil-smear technique is found in NASA Memo 3–17–59L "The Fluorescent-Oil Film Method and Other Techniques for Boundary-Layer Flow Visualization" by Donald L. Loving and S. Katzoff and published in March 1959. For the present invention, it suffices to say that any oil suitable for a specific visual flow test may be employed, with a suitable quantity by weight, of commercial grade lampblack being added thereto to provide an indicated surface flow pattern capable of being molded into a permanent display for photographing or otherwise permanent recordation thereof.

Upon removal of the test model from the wind tunnel, a thin film of catalyzed room-temperature vulcanizable liquid silicone rubber is applied to the model test surface area. The liquid silicone may be sprayed, poured, flowed, or otherwise conventionally applied to the model, with care being taken not to disrupt the surface flow pattern thereon. Any suitable low temperature silicone rubber, such for example General Electric's RTV–11, may be employed as the mold medium.

The viscosity of RTV–11 may range from 80–180 poises with a median viscosity at room temperature being approximately 120 poises, or a consistency essentially equal to that of house paint. A suitable quantity of slow-cure catalyst or liquid metallic soap curing agent, such for example, dibutyl tin dilaurate, is thoroughly mixed with the RTV–11 to initiate cure thereof. One suitable commercially available catalyst of this type is available from Metal and Thermit Corporation, Rahway, New Jersey under the trade name Thermolite–12.

In the present invention, a concentration of approximately 0.3 percent of Thermolite–12 or 0.6 gram by weight, added to 200 grams, by weight of RTV–11 proved adequate to effectively cure the silicone rubber applied to nozzle 11 upon standing at room temperature over night or approximately twelve hours. Catalyst concentrations of 0.1–0.5 percent are normally employed with RTV–11, depending upon the cure time desired in a specific situation. Within limits, as is known in the art, an increase in the concentration of catalyst decreases the curing time of silicone rubber. Similarly, increasing the curing temperature accelerates the cure time, while refrigeration or reduction of the cure environment below room temperature serves to delay cure time.

This specific example is given for exemplification only and other suitable low or room temperature curable rubbers and plastics capable of absorbing and displaying the oilflow pattern may be utilized within the scope of the present invention.

After coating, the model is maintained at room temperature, for a sufficient time, for example one-twenty-four hours, to effect curing of the silicone rubber into a thin removable elastomeric film. As used herein, the term "thin" means coatings of less than one-half inch. Obviously, thicker coatings will require a longer cure period under identical conditions. As cured, the silicone rubber completely absorbs the oil-lampblack flow pattern from the model surface area while retaining all minute details thereof. This flexible film may then be stripped from the model and displayed so as to expose the complete surface flow pattern obtained during the test. For relatively simple configurations as shown in FIGS. 1 and 2, the molded rubber may be stripped from the model by merely pulling or rolling one end thereof internally about itself toward the other end. To facilitate this removal, it may be necessary to cut one or more slits 19, FIG. 3, in the molded material to prevent extreme stretching and possible tearing of the molded pattern. In any event, the absorption of the oil-lampblack solution is so complete by the silicone rubber that there is virtually no possibility of smudging or otherwise disrupting the flow pattern during lifting thereof from the test model.

After removal, the molded pattern may then be displayed, as shown in FIG. 3, to illustrate an accurate view of the surface flow pattern obtained during test, as indicated by the oil streaks molded therein, and designated by reference numeral 18. Molded pattern 17 may then be photographed or otherwise permanently recorded or preserved for future reference. As illustrated in FIG. 3, the presence of incisions or slits 19 in molded pattern 17 does not adversely affect the display of surface flow phenomena obtained by the present invention. As pointed out hereinbefore, the silicone rubber, as cured, completely absorbs all oil from model 15 to thus eliminate the need for cleaning the model prior to further use or testing thereof. Also, since the molded silicone rubber RTV–11 is essentially white in appearance, sharp contrast therewith is obtained with the oil-lampblack indicator. Where other color contrast is desired, suitable commercially available color paste may be added to the silicone rubber before or during addition of the catalysts, in a conventional manner.

Although the present invention has been described and illustrated specifically for obtaining permanent records of surface flow phenomena, it is apparaent to those skilled in the art that the teachings thereof are applicable to other recordation techniques. For example, when it is desirable to remove oil or small particles of debris from otherwise normally inaccessessible locations within test models, or the like, this can be readily accomplished by spraying a quantity of low-temperature vulcanizable rubber into these areas to absorb, or embed, the material to be removed, as the rubber is cured, and stripping the cured rubber therefrom. This is readily accomplished since the rubber, when cured, displays little affinity for metallic and other relatively nonadsorbent surfaces and is thus easily removed therefrom. Similarly, the present inventive process may readily be employed to obtain accurate measurements of the internal contours of various complex configurations.

Another obvious use of the present inventive process is in the inspection of the internal parts of rocket motors, nozzles, and the like for cracks and fissures without dismantlement thereof. Field inspection of internal surfaces of loaded rocket motors, and the like, can be readily made by semi-skilled workmen in this manner with the molded pattern obtained being delivered to specialists to determine the extent of damage and for a decision as to the necessity of replacing the damaged part prior to an actual test. Due to the essentially isothermic cure of silicone rubber, it is safe for use even in direct contact with loaded rocket motor powder charges. Similarly, a considerable savings in manhours may be made by employing the present invention to record the nature and extent of rocket motors, and the like, after accidental explosive damage, insufficient performance, and the like.

It is to be understood, therefore, that the foregoing disclosure relates only to a specific embodiment of the invention, and that numerous modifications, variations and uses of the present invention are possible in the light of the above teachings, as will be readily apparent to those skilled in the art, without departing from the spirit and scope of the present invention, as set forth in the appending claims.

What is claimed and desired to be secured by Letters Patent of the United States is:

1. A method of obtaining a molded pattern of the surface flow obtained in the wind tunnel test of an aerodynamic vehicle model comprising:

applying a flowable indicating medium to selected areas of an aerodynamic model, subjecting the model to a wind tunnel test with flow of the indicating medium during testing producing visual indications of the surface flow phenomena on said model, removing the model from the wind tunnel test area and thereafter applying a coating of a catalyzed room-temperature vulcanizable silicone rubber over the model surface area so as to completely engulf said indicating medium, curing said room-temperature vulcanizable silicone rubber to form a unitary removable elastomeric film, said film, as cured, completely absorbing and retaining the details of the engulfed indicating medium, stripping said elastomeric film from said model and displaying the film so as to expose to view the model surface flow pattern as indicated by the indicating medium absorbed by said film.

2. In a wind tunnel test of surface flow phenomena about a test model when employing the oil-smear technique, the improvement therewith being a method of obtaining a permanent record of the surface flow for a specific test and comprising:
applying a coating of a room-temperature vulcanizable silicone rubber onto the test model after completion of a specific wind tunnel test operation,
curing the coating by permitting the coated model to polymerize at room temperature,
stripping the cured coating from the model so as to expose the interior surface of said cured coating,
said silicone rubber having the inherent physical property characteristics of completely absorbing the oil smear from the model as the rubber is cured to thereby absorb the entire model oil coating and surface flow pattern in precise detail, and
said rubber being of a contrasting color to said oil smear to produce a color contrast permanent molded pattern of the surface flow results obtained in the test.

3. A method of simultaneously cleaning oil from the surface of a wind tunnel model, and making a permanent record of the surface flow phenomena about the model after it has been subjected to a wind tunnel surface flow test in which the oil-smear technique was employed to indicate the model surface flow pattern comprising:
applying a thin coating of a curable rubber composition to the oil-smeared portion of the model,
drying the coated model at room temperature to cure the rubber coating and form a unitary removable elastomeric film,
said composition having the inherent physical property characteristic of slowly absorbing the oil from the model as cured into said unitary film,
stripping said unitary film from the model surface in such manner as to expose the interior film surface area and thereby display the oilflow pattern absorbed from the model as visual indication of the surface flow obtained for a specific model wind tunnel test.

4. The method of claim 3 wherein the oil employed for indicating the surface flow pattern has a quantity of lampblack dispersed therein to enhance the color contrast between said rubber and said flow pattern.

5. A method of determining the surface flow phenomena about surface areas of the aerodynamic test model that are normally inaccessible to photographic and visual aids, comprising:
applying a flowable indicating medium to the test areas of an aerodynamic model,
subjecting said model to a wind tunnel test,
applying a coating of a room-temperature vulcanizable elastomeric material to the test surface area of said model after test completion,
curing said elastomeric material to form a continuous removable film conforming in shape to the coated model surface,
said film, as cured, completely absorbing and retaining the details of the test indicating medium,
removing said film from said model and displaying the film surface area so as to expose the absorbed indicating medium to thereby indicate the surface flow phenomena obtained about the model test surface during the test.

6. The method of claim 5 wherein said indicating medium consists of a mixture of approximately ten parts by weight of oil and approximately one part by weight of lampblack.

7. The method of claim 5 wherein said room-temperature vulcanizable elastomeric material is a silicone rubber.

8. The method of claim 5 including the step of cutting at least one incision in said cured film to facilitate removal thereof from said model.

9. A method of determining and permanently recording the surface flow phenomena about the surface areas of an aerodynamic test model that are inaccessible to normal photographic and visual aids comprising:
applying a flowable indicating medium to the test areas of an aerodynamic model,
subjecting said model to a wind tunnel test,
after testing, applying a coating of a room-temperature vulcanizable silicone rubber over the oilflow on the test surface areas of said model,
curing said elastomeric material to form a continuous removable film conforming in shape to the coated model surface,
said film, as cured, completely absorbing and retaining the details of the test indicating medium pattern,
removing said film from said model and displaying the film surface area so as to expose the absorbed indicating medium to thereby indicate the surface flow phenomena obtained about the test model surface during the test, and
photographing the displayed pattern.

10. The method of claim 9 wherein said flowable indicating medium consists of ten parts by weight of oil and one part by weight of lampblack.

11. The method of claim 9 wherein said aerodynamic test model is of a nonadsorbent metallic construction, said model being cleaned with a degreasing solvent prior to the application of the flowable indicating medium.

12. The method of claim 11 wherein the flowable indicating medium has the physical property characteristic of readily wetting the clean metallic model surface.

13. The method of claim 9 wherein the flowable indicating medium is applied to the test areas of said model in the form of a plurality of individual and spaced drops.

14. The method of claim 9 wherein said room-temperature vulcanizable silicone rubber contains 0.1–0.5 percent of dibutyl tin dilaurate catalyst to facilitate cure thereof.

References Cited by the Examiner

UNITED STATES PATENTS

| | | | |
|---|---|---|---|
| 2,667,070 | 1/1954 | Sockman et al. | 73—104 |
| 2,986,831 | 6/1961 | Terek et al. | 264—131 |

FOREIGN PATENTS

| | | |
|---|---|---|
| 149,610 | 1962 | Russia. |
| 964,915 | 7/1964 | Great Britain. |

References Cited by the Applicant

UNITED STATES PATENTS

| | | |
|---|---|---|
| 2,313,807 | 3/1943 | G. P. Curry. |
| 3,029,538 | 4/1962 | J. A. Terek et al. |
| 3,079,284 | 2/1963 | J. B. Boucher et al. |

DAVID SCHONBERG, *Primary Examiner.*